Nov. 24, 1970   R. J. BUFFET   3,541,720
FISHING SPOONS
Filed Nov. 28, 1967

INVENTOR

*Raymond Jean BUFFET*

*Pierre Lespérance*
AGENT

3,541,720
FISHING SPOONS
Raymond Jean Buffet, Montreal, Quebec, Canada (759
Rue Tacombe, St. Vincent de Paul, Ville de Laval,
Quebec, Canada)
Filed Nov. 28, 1967, Ser. No. 686,357
Int. Cl. A01k *83/00, 91/04*
U.S. Cl. 43—42.19                               3 Claims

ABSTRACT OF THE DISCLOSURE

A fishing spoon adapted to be attached to a line and a hook, a frangible link comprising a readily replaceable, jointless and continuous ring between the spoon and hook. The ring is of uniform cross-section and has a controlled and predetermined breaking resistance which is less than that of said line. The ring will break when the hook is irretrievably caught, enabling a fisherman to retrieve the spoon.

---

The present invention relates to a spoon and hook system for fishing and, more particularly, for trolling and light casting.

In known spoon and hook systems, the hook is attached to the spoon by means of a relatively high strength metal ring which does not break when the hook is irretrievably caught in the water bottom, whereby the fishing line breaks, resulting in the loss of the spoon.

The general object of the invention resides in the provision between the spoon and hook of an endless safety ring, preferably made of a synthetic resin and having a specified and controlled resistance to break, said resistance being less than that of the fishing line.

Another object of the invention resides in the provision of a system of the character described, in which the hook is directly attached to the safety ring and the latter to a fastener, itself attached to the spoon, whereby the hook is located very close to the spoon in order to provide an assembly which is suitable for trolling or light casting.

The foregoing and other objects of the invention will become more apparent during the following disclosure and by referring to the drawings, in which.

In the drawings, like reference characters indicate like elements throughout.

Figure 1:
FIG. 1 is a plan view of the safety ring of the invention.

FIG. 1 shows the safety ring 1 of the invention. It is endless, of circular shape and has a specified and controlled resistance to breakage. It is preferably made of a synthetic resin, for instance nylon.

Figure 2:
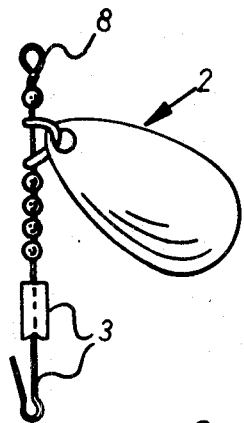
FIG. 2 is a plan view of a fishing spoon or spinner, of conventional construction, and provided with a conventional snap fastener.

FIG. 2 shows a conventional fishing spoon or spinner 2 including at one end an eye 8 for attaching the spoon to a fishing line, not shown, and at the other end a snap fastener 3, of conventional construction and having an openable part.

Figure 3:
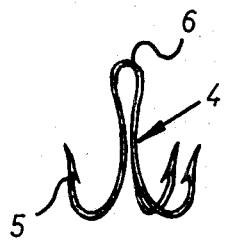
FIG. 3 is a perspective view of a triple gang hook used in the system of the invention.
Figure 4:
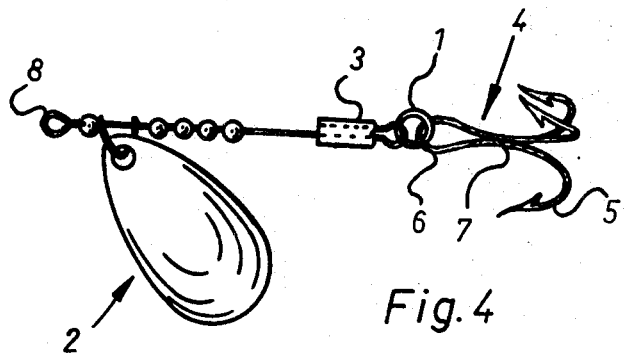
FIG. 4 is a perspective view showing the combination of the spoon, the safety ring and the hook attached one to the other.

FIG. 3 shows a triple gang fishing hook 4 providing three barbs or points 5 at the ends of three contiguous legs forming an eye 6 at the other end. One leg 7 is free from the two remaining legs and form one side of eye 6 so that the free leg 7 can be inserted through the endless ring 1 and the latter made to engage the eye 6. The openable part of the fastener 3 is also inserted through ring 1 and then closed, whereby the resulting assembly is as shown in FIG. 4. As previously stated, ring 1 has a resistance to breaking, which is controlled and specified. This resistance is less than the breaking resistance of the fishing line attached to eye 8 of spoon 2. For instance, if the fishing line is rated to break under a 15-pound pulley, one would select a ring 1 having a 10-pound resistance to breaking. When the hook 4 is irretrievably caught in the water bottom, only the ring 1 will break upon sufficient pulling on the fishing line to thereby retrieve the spoon 2. It is then only necessary to attach a new hook by means of a new ring 1 to the spoon 2. Ring 1 is very light, does not affect in any way the equilibrium or balance of the spoon during casting and does not allow the hook to twist or rotate with respect to the spoon. Ring 1 can be made in various colors for indicating its resistance; for example, rings 1 could be red, green, yellow etc., for specified resistances of 10 pounds, 5 pounds, and 3 pounds respectively.

I claim:

1. In combination, a fishing spoon for trolling or casting adapted to be attached to a line, a fastener device attached to said spoon and having an openable part, a fishing hook having an open eye and a readily replaceable, frangible, jointless, continuous ring connecting and extending through said openable part and said open eye, said ring being of uniform cross-section and having a controlled and predetermined resistance to breakage which is less than that of said line.

2. The combination as claimed in claim 1, wherein said fishing hook is a triple hook with three contiguous legs, one of said legs being free of the other legs and forming with the other legs an open eye.

3. The combination as claimed in claim 1, wherein said ring is made of a synthetic resin.

References Cited

UNITED STATES PATENTS

| | | | |
|---|---|---|---|
| 2,700,242 | 1/1955 | Porth | 43—43.16 X |
| 2,764,833 | 10/1956 | Clark | 43—17.2 |
| 2,768,468 | 10/1956 | Kibler et al. | 43—43.12 |
| 2,796,695 | 6/1957 | Meulnart | 43—44.86 |
| 2,966,878 | 1/1961 | Feiser. | |
| 3,153,898 | 10/1964 | Gerhardt | 59—84 |

FOREIGN PATENTS 906,476    5/1945    France.

SAMUEL KOREN, Primary Examiner

J. H. CZERWONKY, Assistant Examiner

U.S. Cl. X.R.

24—201; 43—43.12, 44.82, 44.86